US008886930B1

(12) United States Patent
Thornewell et al.

(10) Patent No.: US 8,886,930 B1
(45) Date of Patent: Nov. 11, 2014

(54) DNS FLOOD PROTECTION PLATFORM FOR A NETWORK

(75) Inventors: Peter M. Thornewell, Seattle, WA (US); Lisa M. Golden, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/567,938

(22) Filed: Aug. 6, 2012

Related U.S. Application Data

(63) Continuation of application No. 12/018,031, filed on Jan. 22, 2008, now Pat. No. 8,261,351.

(51) Int. Cl.
| | | |
|---|---|---|
| *H04L 29/06* | (2006.01) | |
| *H04L 9/32* | (2006.01) | |
| *G06F 7/04* | (2006.01) | |
| *G06F 12/14* | (2006.01) | |
| *G06F 15/173* | (2006.01) | |
| *G06F 15/16* | (2006.01) | |

(52) U.S. Cl.
USPC ........... 713/162; 713/165; 713/168; 713/170; 726/5; 726/23; 726/27; 709/225; 709/245

(58) Field of Classification Search
USPC .......... 726/23, 5, 27; 713/162, 165, 168, 170; 709/225, 245
See application file for complete search history.

(56) References Cited

U.S. PATENT DOCUMENTS

| | | | |
|---|---|---|---|
| 6,463,533 B1 | 10/2002 | Calamera et al. | |
| 7,296,076 B1 * | 11/2007 | Portolani | ...................... 709/227 |
| 7,373,512 B1 | 5/2008 | Just | |
| 7,620,733 B1 | 11/2009 | Tzakikario et al. | |
| 7,987,366 B2 * | 7/2011 | Blom et al. | .................... 713/171 |
| 8,261,351 B1 | 9/2012 | Thornewell et al. | |
| 2003/0110274 A1 * | 6/2003 | Pazi et al. | ...................... 709/229 |
| 2005/0100165 A1 * | 5/2005 | Rose et al. | .................... 380/270 |
| 2006/0212587 A1 * | 9/2006 | Barsuk | .......................... 709/228 |
| 2006/0294196 A1 * | 12/2006 | Feirouz et al. | ................ 709/217 |
| 2007/0064610 A1 | 3/2007 | Khandani et al. | |
| 2007/0067839 A1 | 3/2007 | Hamada et al. | |
| 2007/0067841 A1 | 3/2007 | Yegneswaran et al. | |
| 2007/0107051 A1 * | 5/2007 | Carter | ............................ 726/21 |

(Continued)

OTHER PUBLICATIONS

"ICANN | DNSSEC Workshop Real-Time Captioning | Mar. 28, 2006" DNSSEC Workshop, ICANN Meetings in Wellington, New Zealand, 14 pages http://www.iocann.org/en/meetings/wellington/captioning-dnssec-28mar06.htm accessed Aug. 1, 2011.

(Continued)

*Primary Examiner* — Aravind Moorthy
(74) *Attorney, Agent, or Firm* — John W. Branch; Lowe Graham Jones PLLC

(57) ABSTRACT

Embodiments are directed towards providing protection to DNS servers against DNS flood attacks by causing a requesting device to perform multiple DNS lookup requests for resolving a resource record. A request from a network device for a resolution of a domain name may be received by a device interposed between the requesting network device and a DNS server. Upon receiving the request to resolve the domain name, the interposed device may respond with a CNAME that includes a cookie. The requesting device may then send another request that includes the cookie preceded CNAME. The interposed device may then validate the returned cookie returned in the CNAME and if valid, forward the domain name resolution request on to a DNS server. The response may then be forwarded to the requesting device.

15 Claims, 4 Drawing Sheets

(56) References Cited

U.S. PATENT DOCUMENTS

| | | | |
|---|---|---|---|
| 2008/0104182 A1* | 5/2008 | Jimmei | 709/206 |
| 2008/0229394 A1* | 9/2008 | Stering et al. | 726/4 |
| 2009/0144806 A1* | 6/2009 | Gal et al. | 726/3 |
| 2010/0027551 A1 | 2/2010 | Arkin | |

OTHER PUBLICATIONS

"Black Hat Technical Security Conference // Home" 1997, 2 pages http://www.blackhat.com accessed Aug. 1, 2011.

"DNS Security (DNSSEC) Solutions | F5 Networks" 1998-2011, 2 pages http://www.f5.com/solutions/security/dnssec accessed Aug. 1, 2011.

"Computer Security Services | Application Security | ioactive.com" IOActive, 1998-2011, 1 page http://www.ioactive.com/index.html accessed Aug. 1, 2011.

"Surviving DNS DDoS Attacks: Introducing self-protecting servers," White Paper, Secure64 Software Corporation, Mar. 19, 2007, 18 pages.

"The-binary Advisory," The Honeynet Project, 4 pages http://www.honeynet.org/reverse/results/sol/sol-17/advisory.html accessed Feb. 20, 2008.

"Denial-of-service attack," Wikipedia, the free encyclopedia, 10 pages http://en.eikipedia.org/w/index.php?title=Denial-of-service_attack&printable=yes accessed Nov. 5, 2007.

"Canonical Name Record (CNAME)," CNAME Record: Chapter 8, ZyTrax, Inc., Dec. 28, 2007, 3 pages http://www.zytrax.com/books/dns/ch8/cname.html accessed Feb. 20, 2008.

Official Communication for U.S. Appl. No. 12/018,031 mailed Nov. 23, 2010.

Official Communication for U.S. Appl. No. 12/018,031 mailed May 2, 2011.

Official Communication for U.S. Appl. No. 12/018,031 mailed Jul. 21, 2011.

Official Communication for U.S. Appl. No. 12/018,031 mailed Aug. 17, 2011.

Official Communication for U.S. Appl. No. 12/018,031 mailed Jan. 18, 2012.

Official Communication for U.S. Appl. No. 12/018,031 mailed May 3, 2012.

\* cited by examiner

DNS FLOOD PROTECTION PLATFORM FOR A NETWORK

CROSS REFERENCE

This Application is a Continuation Patent Application of U.S. patent application Ser. No. 12/018,031, filed Jan. 22, 2008, entitled "DNS flood protection platform for a network," the benefit of the earlier filing date of which is hereby claimed under 35 U.S.C. §120and which is further incorporated herein by reference in its entirety.

TECHNICAL FIELD

The present invention relates generally to network communications, and more particularly, but not exclusively, to causing a network device to perform multiple DNS lookup requests for resolving a resource record, such as a domain name, to hinder DNS flood attackers.

BACKGROUND

A denial of service (DoS) attack in the world of networking typically refers to an attempt directed towards rendering a computer resource unavailable by overwhelming the resource with requests. A typical DoS attack involves sending over the network a large quantity of requests to the computing resource in a very short period of time interval in what is known as a network traffic storm to intentionally cause disruptions in the computer resource's communications. There are a variety of mechanisms used to overwhelm a computer resource on the network using DoS attacks, including, but not limited to reflected floods, amplification attacks, and malformed TCP/IP packets.

Today, virtually any computing resource connected to a network may be vulnerable to such attacks. For example, Domain Name Systems (DNS) servers provide a valuable service to users of the internet by resolving internet domain names into network addresses to locate a service on the internet. Disrupting services from a DNS server may significantly disrupt access to a large number of other services that depend on such translations. Therefore, it is not a surprise to discover that DNS servers have been ranked on the SysAdmin, Audit, Networking, and Security (SANS) Institute's Top-20 Internet Security Attack Targets list for seven consecutive years. For example, in February 2007, at least three of the thirteen DNS root servers were flooded with malformed DNS packets during a DoS attack. Several of the servers experienced brief outages as a result, including the U.S. Department of Defense's G server.

One commonly used approach to attacking DNS servers includes DNS floods. DNS floods typically involve sending a large number of domain name queries to a given DNS server over a short time period to disrupt the server's ability to adequately respond to DNS requests. Thus, there is a desire to provide security protection to at least DNS servers, although other network services are also at risk. Therefore, it is with respect to this consideration and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
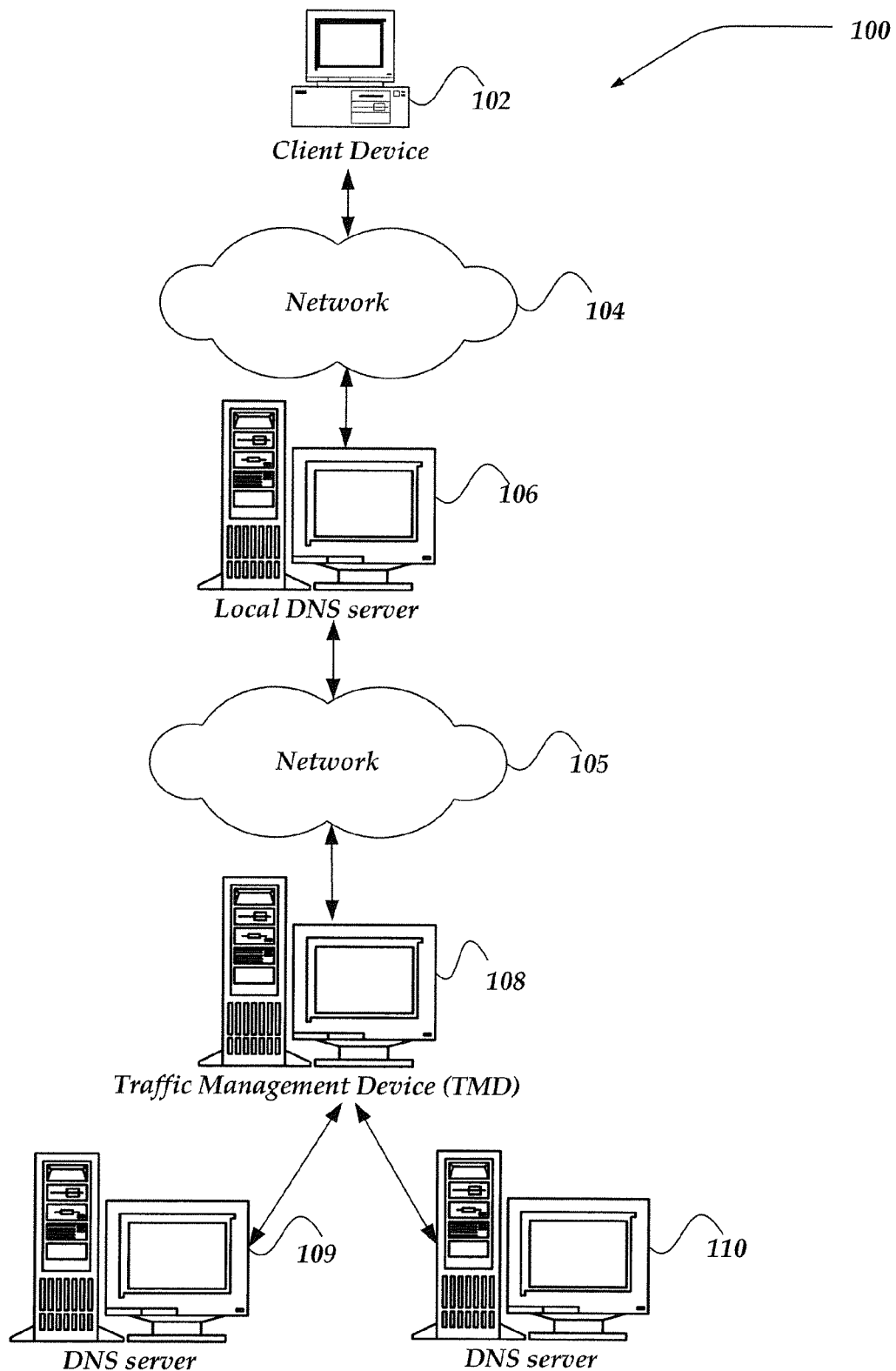
FIG. 1 shows a block diagram illustrating an environment for practicing the invention.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection is a TCP/IP connection, sometimes called a TCP connection. TCP/IP connections are virtual connections between two network nodes, and are typically established through a TCP/IP handshake protocol. The TCP/IP protocol is described in more detail in Request for Comments (RFC) 793, and/or RFC 1323, which are available through the Internet Engineering Task Force (IETF), and are each herein incorporated by reference. However, the invention is not limited to TCP/IP connections, and other network connection types may also be used. For example, User Datagram Protocol (UDP)/IP, and/or other networking protocols may also be used, without departing from the scope of the invention.

As used herein a CNAME record or canonical name record refers to domain name record that is configured to provide an alias of one domain name to another domain name. One example, of a format of such records is described in more detail below in conjunction with FIG. 4. Moreover, CNAMEs are also described in more detail in Request for Comments (RFC) 1035,entitled "Domain Names—Implementation And Specification," which is available through the Internet Engineering Task Force (IETF), and which is incorporated herein by reference. It is noted that CNAME records are sometimes also referred to as CNAME resource records or CNAME RRs.

Briefly, embodiments of the invention are directed towards systems, processor readable storage media, and methods for providing protection to DNS servers against at least DNS flood attacks by causing a requesting device to perform multiple DNS lookup requests for resolving a resource record. In one embodiment, the resolution of the resource record may include resolving a resource location. A request from a network device for a resolution of a domain name may be received by another network device that is interposed between the requesting network device, and at least one DNS server. In another embodiment, at least some of the actions of the interposed device to request multiple DNS lookup requests may also be implemented within at least one of the DNS servers. For example, in one embodiment, an application may be implemented such that a DNS server is configured to answer itself. That is, in one embodiment, The DNS server's functions could be integrated within another device, such as a traffic management device, or the like. Furthermore, in one embodiment, the herein described flood protector component could be written into the DNS, or otherwise integrated within the DNS functions.

In one embodiment, the interposed device is a traffic management device (TMD). Upon receiving the request to resolve the domain name, the interposed device may respond with a CNAME that includes at least an alias domain name. In one embodiment, the alias domain name includes a cookie. In one embodiment, the response may include a time to live (TTL). If the request is valid, the requesting device is expected to send another request, where the other request includes the alias domain name with the cookie. The interposed device may then validate the returned cookie for the CNAME, and if valid, send a request for resolution of the original domain name on to a DNS server. The DNS server may then resolve the original domain name requested and provide the results to the interposed device, which may in turn provide the response back to the requesting device.

In one embodiment, the cookie may be a randomly generated value. In another embodiment, the cookie may include additional information useable to validate the request, such as an embedded sub-domain name, a network address of associated with the source of the first request, or the like. In one embodiment, the cookie may be encrypted. In one embodiment, performing at least a double-query challenge such as described above may be selectively performed based on a variety of criteria, such as under when the interposed device detects an increase in a load condition, or the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, local Domain Name Service (DNS) 106, Traffic Management Device (TMD) 108, DNS servers 109-110, and networks 104-105. Local DNS server 106 is in communication with TMD 108 through network 105 and client device 102 through network 104. TMD 108 is in communication with DNS servers 109-110. Although not illustrated, a network similar to networks 104-105 may reside between TMD 108 and DNS servers 109-110.

Generally, client device 102 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 102 may also include other computing devices, such as personal computers, multiprocessor systems, microprocessor-based or programmable consumer electronics, network devices, and the like. As such, client device 102 may range widely in terms of capabilities and features. For example, a client device configured as a cell phone may have a numeric keypad and a few lines of monochrome LCD display on which only text may be displayed.

Client device 102 also may include at least one client application that is configured to receive content from another computing device. The client application may include a capability to provide and receive textual content, graphical content, audio content, alerts, messages, and the like. Moreover, client device 102 may be further configured to communicate a message, such as through a Short Message Service (SMS), Multimedia Message Service (MMS), instant messaging (IM), internet relay chat (IRC), mIRC, Jabber, and the like, between another computing device, and the like.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

In one embodiment, client device 102 may be configured such that an end-user may operate the computing device to make requests for data and/or services from other computers on the network. In one embodiment, access to the data and/or services might be performed using a domain name service, such as local DNS server 106, and/or DNS servers 109-110 to resolve a domain name into a network address useable to locate a computer over networks 104,105, or the like. For example, in one embodiment, client device 102 might send a request over network 105 to local DNS server 106 to have a domain name resolved into a network address. In one embodiment, local DNS server 106 may translate the domain name and provide a corresponding network address in a response to client device 102. However, in one embodiment, local DNS server 106 might send the request over network 105 towards TMD 108.

In one embodiment, client device 102 might make a legitimate request for a domain name resolution. However, in another embodiment, client device 102 might be involved directly or indirectly in a DNS denial of service attack, using, for example, a DNS flood attack. As such, in one embodiment, client device 102 (and/or a plurality of other client devices and/or another DNS server not illustrated) might be sending a plurality of requests to TMD 108 to have a domain name resolved.

Networks 104-105 are configured to couple one computing device with another computing device. Networks 104-105 may be enabled to employ any form of computer readable media for communicating information from one electronic device to another. Also, networks 104-105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Networks 104-105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 104-105 may also include an autonomous system of terminals, gateways, routers, and the like connected by wireless radio links, and the like. These connectors may be configured to move freely and randomly and organize themselves arbitrarily, such that the topology of networks 104-105 may change rapidly.

Networks 104-105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, networks 104-105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, networks 104-105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment, of TMD 108 is described in more detail below in conjunction with FIG. 2. Briefly, however, TMD 108 may include virtually any device that manages network traffic. Such devices include, for example, routers, proxies, firewalls, load balancers, cache devices, devices that perform network address translation, any combination of the preceding devices, and the like. TMD 108 may, for example, control the flow of data packets delivered to and forwarded from an array of servers, such as DNS servers 109-110. TMD 108 may direct a request to a particular server based on network traffic, network topology, capacity of a server, content requested, and a host of other traffic distribution mechanisms. TMD 108 may receive data packets from and transmit data packets to the Internet, an intranet, or a local area network accessible through another network. TMD 108 may recognize packets that are part of the same communication, flow, and/or stream and may perform special processing on such packets, such as directing them to the same server so that state information is maintained. TMD 108 also may support a wide variety of network applications such as web browsing, email, telephony, streaming multimedia and other traffic that is sent in packets. The BIG-IP® family of traffic managers, by F5 Networks Inc. of Seattle, WA, are one example of TMDs. Moreover, TMDs are described in more detail in U.S. Pat. No. 7,102,996 to Amdahl, et al. entitled "Method and System for Scaling Network Traffic Managers," which is incorporated herein by reference.

TMD 108 may receive a DNS domain name resolution request from local DNS server 106. TMD 108 may select a server from DNS servers 109-110 to forward the request. It should be noted, however, that in at least one embodiment, a DNS server may also be configured to answer itself. That is, in one embodiment, flood protector functions may be integrated with the DNS server's functionality. TMD 108 may employ any of a variety of criteria and mechanisms to select the server, including those mentioned above, load balancing mechanisms, or the like. TMD 108 is further configured to receive a response to the request and to forward the response to local DNS server 106.

TMD 108 may receive a request for a resolution of a domain name from local DNS server 106, and optionally select to perform at least a double-query challenge of the request. TMD 108 may select to perform the challenge based on any of a variety of conditions, criteria, events, or the like. For example, TMD 108 might select to perform at least the double-query challenge based on, but not limited to detecting a network load above a first threshold, detecting a load above a second threshold on at least one processor within TMD 108, detecting a denial of service attack, receiving an indication of a security threat, or the like.

If TMD 108 selects to perform at least the double-query challenge, TMD 108 may then respond to the request by providing a CNAME record with an alias domain name. The alias domain name may include a cookie, in one embodiment, where the cookie might be created using any of a variety of mechanisms. For example, the cookie might be created based on a random value, a sub-domain name, a value that is based on a network address associated with the requesting device (e.g., local DNS server 106, client device 102, or the like), or the like. In one embodiment, the cookie might be encrypted using any of a variety of encryption mechanisms, including but not limited to symmetric key mechanisms, asymmetric key mechanisms, or the like. In one embodiment, the CNAME record includes a time to live (TTL) associated with it such that requests using the alias domain name that are received after expiration of the time to live are considered to be invalid requests.

If TMD 108 receives a request for resolution of the alias domain name within a valid time period, and/or from a same network address as the request for the original domain name, TMD 108 may send a request to one of DNS servers 109-110 to resolve the original domain name. When TMD 108 receives a response from one of DNS servers 109-110, TMD 108 may provide the response to local DNS server 106. One embodiment of possible requests and responses for resolving a domain name using at least the double-query challenge is described in more detail below in conjunction with FIG. 4. In one embodiment, TMD 108 may employ a process substantially similar to that described below in conjunction with FIG. 3 to perform at least some of its actions.

Local DNS server 106 represents virtually any computing device that is configured and arranged to perform domain name lookup resolutions. Typically, local DNS server 106 might be configured to operate within such as an intranet, or the like. In one embodiment, local DNS server 106 might be configured and operated by an Internet Service Provider (ISP), or the like. As such, local DNS server 106 might be configured to receive requests for domain name resolutions from, for example, client device 102, another DNS server, or the like. Local DNS server 106 might attempt to resolve the request based on information that it might have, such as from a prior request, a local data store, or the like. If local DNS server 106 is unable, for any of a variety of reasons, to resolve the requested domain name, local DNS server 106 may forward the request to TMD 108 to have one of DNS servers 109-110 resolve the domain name. DNS servers 109-110 may be considered to be at least one of a root DNS server, authoritative server, or the like, configured to resolve domain names into network addresses, as well as to receive other resource requests for resolution.

Devices that may operate as TMD 108, local DNS server 106, and/or DNS servers 109-110 include but are not limited to personal computers, desktop computers, multiprocessor systems, microprocessor-based or programmable consumer electronics, network PCs, servers, or the like.

Illustrative Network Device

Figure 2:
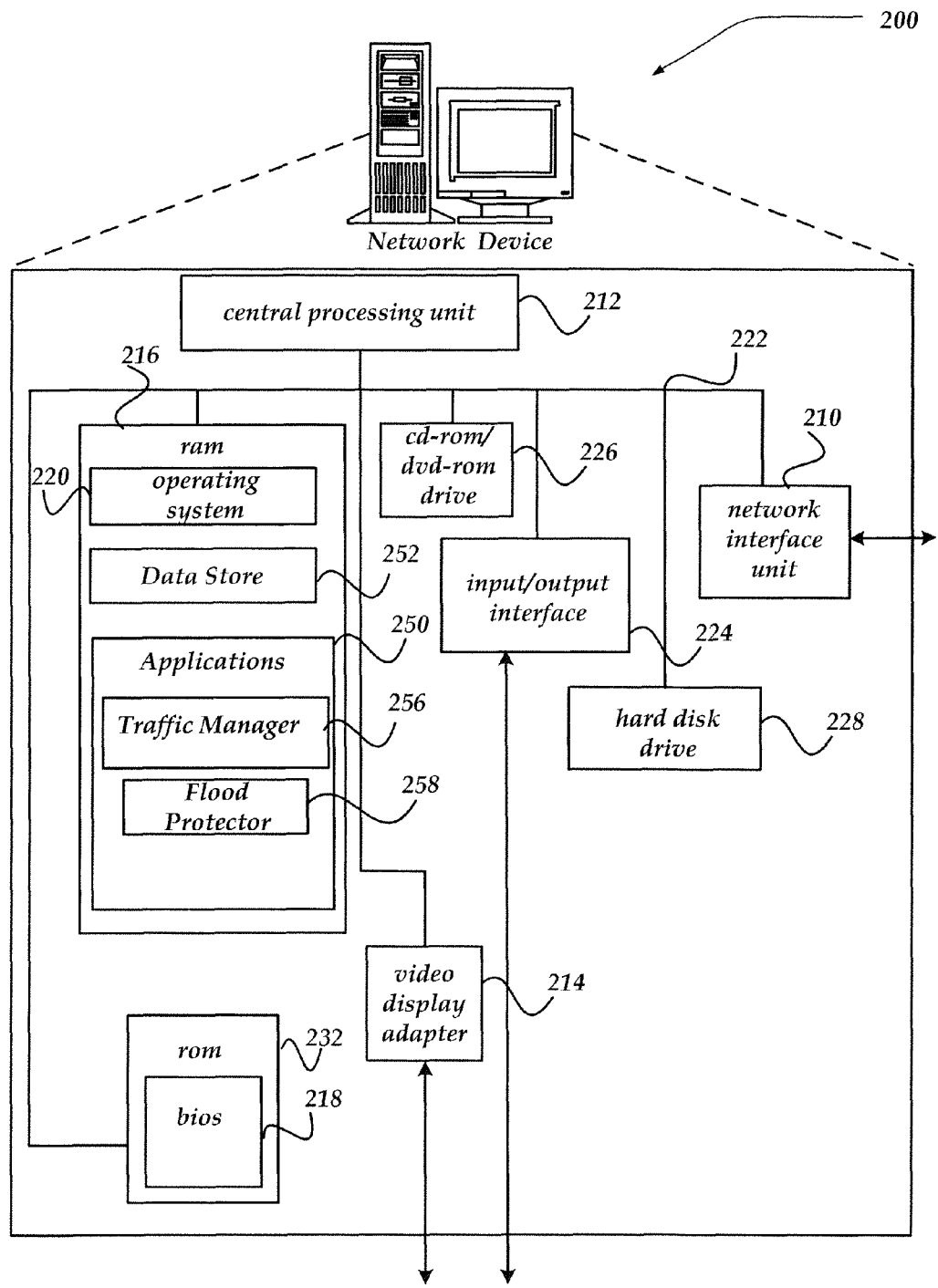
FIG. 2 illustrates one embodiment of a network device for managing DNS Floods.

FIG. 2 shows one embodiment of a network device, according to one embodiment of the invention. Network device 200 may include many more or less components than those shown. The components shown, however, are sufficient to disclose an illustrative embodiment for practicing one or more embodiments of the invention. Network device 200 may represent, for example, TMD 108 of FIG. 1.

Network device 200 includes at least one central processing unit (cpu) 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200.

As illustrated in FIG. 2, network device 200 also can communicate with the Internet, or some other communications network via network interface unit 210, which is constructed for use with various communication protocols including the IP protocol. Network interface unit 210 is sometimes known as a transceiver, transceiving device, or network interface card (NIC).

The mass memory 216, 226, 228, and 232 described herein and shown in FIG. 2 illustrates another type of computer-readable media, namely computer readable, machine readable storage media, or processor readable storage media. Computer readable storage media may include volatile, non-volatile, removable, and non-removable media implemented in any method or technology for storage of information, such as computer readable instructions, or machine-readable instructions, data structures, program modules, or other data, which may be obtained and/or executed by at least one central processing unit 212 to perform one or more portions of process 300 FIG. 3, for example. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer executable instructions, and which can be accessed by a computing device.

The mass memory may also store other types of program code and data as applications 250, which may be are loaded into mass memory and run on operating system 220. Examples of application 250 may include email client/server programs, routing programs, schedulers, web servers, calendars, database programs, word processing programs, HTTP programs, RTSP programs, security programs, and any other type of application program. Applications 250 may also include traffic manager 256 and flood protector 258. In one embodiment, ram 216 may include data store 252; however, data store 252 may also reside completely, or in part, in another mass memory storage media, including, but not limited to a storage device readable by cd-rom/dvd-rom drive 226, on hard disk drive 228, or even on a computer readable storage medium on another network device and possibly accessible by network device 200 through such as network interface unit 210.

Data store 252 may include virtually any mechanism configured and arranged to store data and/or computer readable instructions. As such, data store 252 may include flood protection data such as time to live (TTL) information, CNAME records, alias domain names, random values, communication state data, threat detection data, rules, policies, or the like.

Traffic manager 256 is configured and arranged to include any component configured to receive a request for a service (e.g., a DNS domain name resolution request) and to select and to provide the request to a server based on any of a plurality of load-balancing metrics, including network traffic, network topology, capacity of a server, characteristic of the request, a round-robin metric, a domain name requested, or the like.

In one embodiment, traffic manager 256 might employ flood protector 258 to perform at least the double-query challenge of a DNS domain name request as described herein. In one embodiment, traffic manager 256 might select to employ flood protector 258 to perform at least the double-query challenge for virtually every request. However, in another embodiment, traffic manager 256 may be configured to employ flood protector 258 based on a variety of conditions, events, or the like. For example, traffic manager 256 might employ flood protector 258 based on, but not limited to detecting a network load above a first threshold, detecting a load above a second threshold on the at least one processor (one or more of central processing unit 212, for example), detecting a denial of service attack, receiving indication of a security threat, or the like.

Flood protector 258 is configured and arranged to perform at least a double-query challenge for DNS requests to determine whether the request is valid. Directing a requestor to perform at least a double-query challenge for resolving a domain name is directed towards hindering DNS DoS attackers, without significantly impacting valid requestors. It should be noted that the challenge is referred to herein as at least a double-query challenge, indicating that the challenge may include more than a double-query, and is not limited to merely double-queries. For example, the query approach described herein may employ three-queries, four queries, or the like, without departing from the scope of the invention.

In any event, flood protector 258 is configured to receive a request for a domain name resolution through traffic manager 256. Flood protector 258 may then prepare and provide a response that includes an alias domain name, using, for example, a CNAME record. In one embodiment, the alias domain name may include a cookie, wherein the cookie might include a random value, a sub-domain name, a network address of the requesting device, or the like. In one embodiment, the cookie might be encrypted. Additionally, in one embodiment, the alias domain name includes a time to live (TTL) associated with it, such that if a request for resolution of the domain name is received after the expiration of the TTL, the request may be deemed to be invalid. Similarly, in one embodiment, use of the network address of the requestor may enable a determination to be sure that the request for resolution of the alias domain name is from the same requesting device as that of the original domain name request. If the requests are from different devices, the request might be deemed invalid.

However, if the request for resolution of the alias domain name is deemed valid, flood protector 258 may forward the request for resolution of the original domain name to a DNS server selected by traffic manager 256. When the DNS server provides a response for which the domain name resolves flood protector 256 may then provide a response for the requesting device that maps that response to the alias domain name. In one embodiment, flood protector 258 may employ a process similar to process 300 of FIG. 3 to perform at least some of its actions.

Network device 200 may also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like.

Network device 200 may also include input/output interface 224 for communicating with external devices, such as a mouse, keyboard, scanner, or other input/output devices not shown in FIG. 2. Likewise, network device 200 may further include additional mass storage facilities such as cd-rom/dvd-rom drive 226 and hard disk drive 228. Hard disk drive 228 may be utilized to store, among other things, application programs, databases, and the like in the same manner as the other mass memory components described above.

In one embodiment, the network device 200 may include at least one Application Specific Integrated Circuit (ASIC) chip (not shown) coupled to bus 222. The ASIC chip can include logic that performs some or all of the actions of network device 200. For example, in one embodiment, the ASIC chip can perform a number of packet processing functions for incoming and/or outgoing packets. In one embodiment, the ASIC chip can perform at least a portion of the logic to enable the operation of traffic manager 256, flood protector 258, or any other components.

In one embodiment, network device 200 can further include one or more field-programmable gate arrays (FPGA) (not shown), instead of, or in addition to, the ASIC chip. A number of functions of network device 200 can be performed by the ASIC chip, the FPGA, by CPU 212 with instructions stored in memory, or by any combination of the ASIC chip, FPGA, and a CPU.

Generalized Operation

Figure 3:
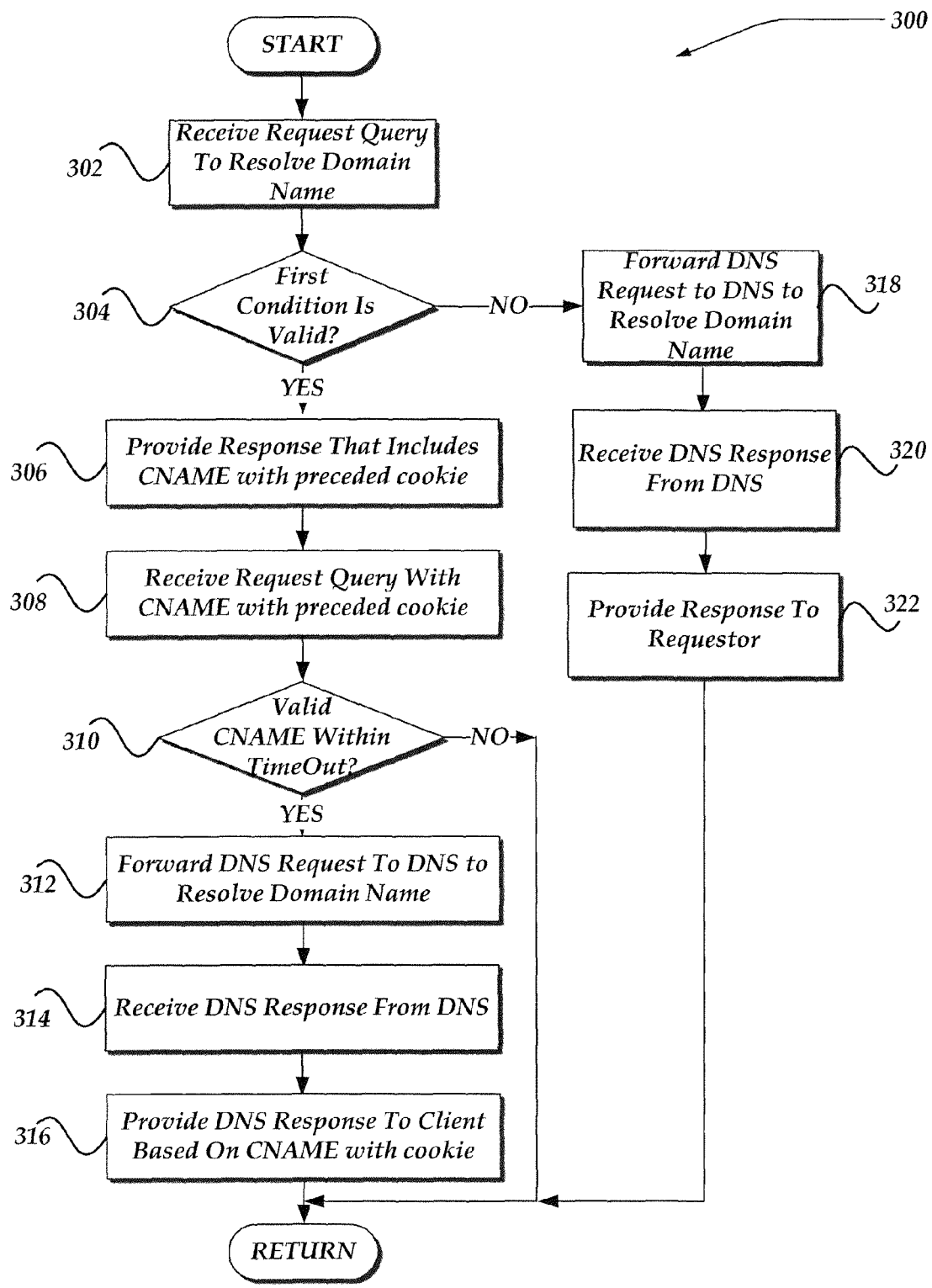
FIG. 3 illustrates a logical flow diagram generally showing one embodiment of a process for managing DNS Floods.
Figure 4:
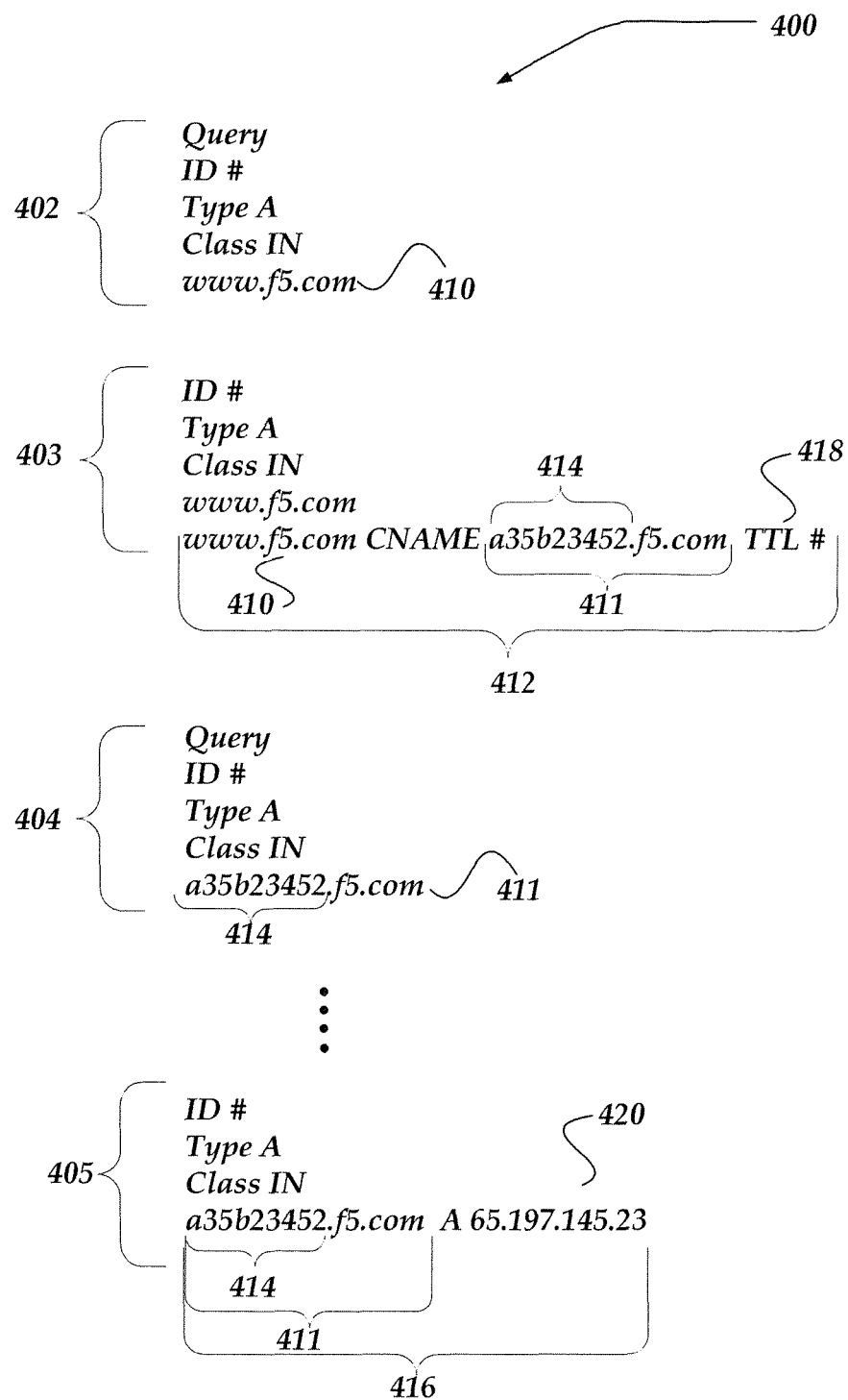
FIG. 4 illustrates one example of DNS request/responses useable in one embodiment of managing DNS Floods.

The operation of certain aspects of the invention will now be described with respect to FIGS. 3-4. FIG. 3 illustrates a logical flow diagram generally showing one embodiment of a process 300 for managing DNS Floods, while FIG. 4 may be used to illustrate various example request/responses useable with process 300. Process 300 may be implemented, in one embodiment, within TMD 108 of FIG. 1. However, the invention is not so limited. For example, with appropriate and envisaged modifications, in one embodiment, process 300 may also be implemented within at least one DNS server 109-110 of FIG. 1.

In one embodiment, process 300 begins, after a start block, at block 302, where a domain name query is received requesting that the domain name be resolved to a network address (or more generally, any DNS record or resource record to be resolved). Response flow 400 of FIG. 4 illustrates one example of a query 402. As shown, query 402 includes various information including a domain name 410 to be resolved into a response, such as a network address, or the like. It should be noted that while query 402 illustrates use of a type "A" record, the invention is not so constrained. For example, type "AAAA" or "A6" records, or virtually any DNS record type, may also be employed, without departing from the scope of the invention.

Processing next flows to decision block 304, where a determination is made whether a first condition is valid. In one embodiment, decision block 304 is used to determine when to perform the at least double-query challenge. In one embodiment, the determination may be to always perform the challenge. However, in another embodiment, the determination of whether to perform the challenge may be based on any of variety of criteria, including, but not limited to detecting a network load above a first threshold, detecting a load above a second threshold on the at least one processor, detecting a denial of service attack, or receiving indication of a security threat. In any event, if the condition is met (valid), processing flows to block 306; otherwise, processing flows to block 318.

At block 306, a challenge is provided to the requesting device. In one embodiment, the challenge uses a CNAME with at least an alias domain name. The alias domain name may include a cookie that is determined based on any of a variety of mechanisms, including, but not limited to a random value, a sub-domain name, a network address or other identifier associated with the requesting device, a time stamp, or the like. In one embodiment, the cookie may be encrypted. Referring to FIG. 4, challenge 403 illustrates one embodiment of a possible challenge. As illustrated, CNAME record 412 of challenge 403 includes the requested domain name 410, alias domain name 411, and a time to live (TTL) 418. As shown, alias domain name 411 includes cookie 414 (e.g., a35b23452). It is expected that valid requestors are configured and arranged to employ CNAME records.

Continuing to block 308, a second request may be received based on the challenge. In this instance, the second request is anticipated to include a request to resolve the alias domain name. Thus, again referring briefly to FIG. 4, the second request 404 shows a request to resolve the alias domain name 411.

Processing continues to decision block 310, where a determination is made whether the second request is valid. Validation includes, but is not limited to receiving this second request, to resolve the alias domain name, within the time to live period. In another embodiment, the cookie portion of the alias domain name may be examined to determine whether it includes a same network address as that device sending the second request. In another embodiment, the cookie might include a time stamp, or other embedded information useable to determine a validity of the second request. In any event, if the second request is determined to be invalid, processing may return to a calling process to perform other actions. Otherwise, if the second request is determined to be valid, processing may continue to block 312.

At block 312, the original domain name resolution request received at block 302 may be forwarded to a selected DNS server, or the like. Processing continues to block 314, where a response, such as, for example, a network address, or the like, is received in response to the request for resolution of the original domain name.

Flowing next to block 316, the network address, or the like, may then be used to provide a response to the requestor for the resolution of the alias domain name. For example, referring briefly, again, to FIG. 4, address resolution response 405 illustrates that alias domain name 411 resolves to the received network address 420 (or possibility another response type) for the original domain name 410. Resolution response 405 may then be provided to the requesting device. Process 300 may then return to the calling process to perform other actions.

At block 318, however, the original domain name from block 302 may be forwarded to a selected DNS server for resolution. Continuing to block 320, the resolved response may be received from the DNS server, and at block 322, the response may be sent to the requesting device. Process 300 may then return to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a resource record request over a network, comprising:
   a memory arranged to store data and instructions; and
   a processor arranged to enable actions embodied by at least a portion of the stored instructions, the actions comprising:
      receiving, from a requestor, a resource record query to resolve a first resource record;
      determining whether to perform a double-query challenge on the first resource record based on at least a load of the processor being above a threshold;
      if the double-query challenge is performed:
         determining a mapping of the first resource record to a second resource record that includes an embedded cookie within the second resource record, the cookie further includes a time to live (TTL) within which a response record query is to be received;
         providing a response that includes the mapping to the second resource record without resolving the first resource record;
         receiving the resource record query to resolve the second resource record; and
         if the request to resolve the second resource record is valid based in part on evaluating an address associated with the requestor that is embedded in the second resource record with another address associated with a source of the query to resolve the second resource record, and further determining that the request is valid based on being received within the TTL, providing a resource record resolution response based on resolution of the first resource record; and
      otherwise, providing a resolution response of the first resource record.

2. The network device of claim 1, wherein providing the response that includes the mapping further comprises, providing the response using a canonical name (CNAME) record mapping the first resource record to the second resource record.

3. The network device of claim 1, wherein providing a resource record resolution response further comprises:
   sending a request to a domain name system (DNS) server to resolve the first resource record query;
   receiving from the DNS server in response, a resource record response associated with the first resource record request;
   mapping the resource record into a response for the second resource record resolution; and
   providing the mapped resource record response to the requester.

4. The network device of claim 1, wherein the second resource response to the query includes at least one of a random value, or a sub-domain name.

5. The network device of claim 1, wherein the resource record query is to resolve a domain name associated with the first resource record.

6. A physical apparatus having machine-executable instructions stored thereon, which when executed by at least one processor within a network device, causes the at least one processor to perform actions, comprising:
   receiving, from a requestor, a resource record query to resolve a first resource record;
   determining whether to perform a double-query challenge on the first resource record based on at least a load of the at least one processor being above a threshold;
   if the double-query challenge is performed:
      determining a mapping of the first resource record to a second resource record;
      providing a response that includes a mapping to the second resource record without resolving the first resource record, wherein the second resource record includes an embedded cookie within the second resource record, the cookie further includes a time to live (TTL) within which a response record query is to be received;
      receiving the resource record query to resolve the second resource record; and
      if the request to resolve the second resource record is valid based in part on evaluating an address associated with the requestor that is embedded in the second resource record with another address associated with a source of the query to resolve the second resource record, and further determining that the request is valid based on being received within the TTL, providing a resource record resolution response based on resolution of the first resource record, otherwise, providing a resolution response of the first resource record; and wherein the actions above are performed by the at least one processor operating within the network device.

7. The apparatus of claim 6, wherein providing the response that includes the mapping results in providing at least a three-query challenge to the resolution of the first resource record.

8. The apparatus of claim 6, wherein the mapping includes a canonical name (CNAME) record with the mapping based in part on a random value.

9. The apparatus of claim 6, wherein at least a part of the second resource record is encrypted.

10. The apparatus of claim 6, wherein the second resource record includes the cookie that includes at least one of a random value, an encrypted value, or a sub-domain name.

11. The apparatus of claim 6, wherein providing a resource record resolution response further comprises:

sending a request to a domain name system (DNS) server to resolve the first resource record query;

receiving from the DNS server in response, a resource record response associated with the first resource record request;

mapping the resource record into a response for the second resource record resolution; and providing the mapped resource record response to the requestor.

12. A system, comprising:

a domain name system server configured to enable resolution of records; and a network device having a processor that performs actions, including:

receiving, from a requestor, a resource record query to resolve a first resource record;

determining whether to perform a double-query challenge on the first resource record based on at least a load of the processor being above a threshold;

if the double-query challenge is performed:

determining a mapping of the first resource record to a second resource record, wherein the first resource record and the second resource record are at a same protocol layer, wherein the second resource record includes an embedded cookie within the second resource record, the cookie further includes a time to live (TTL) within which a response record query is to be received;

providing a response that includes the mapping to the second resource record;

receiving the resource record query to resolve the second resource record; and if the request to resolve the second resource record is valid based in part on evaluating an address associated with the requestor that is embedded in the second resource record with another address associated with a source of the query to resolve the second resource record, and further determining that the request is valid based on being received within the TTL, providing a resource record resolution response based on resolution of the first resource record; and otherwise, providing a resolution response of the first resource record.

13. The system of claim 12, wherein providing the response that includes the mapping further comprises, providing the response using a canonical name (CNAME) record mapping the first resource record to the second resource record.

14. The system of claim 12, wherein the second resource response to the query includes at least one of a random value, or a sub-domain name.

15. The system of claim 12, wherein providing the response that includes the mapping results in providing at least a three-query challenge to the resolution of the first resource record.

* * * * *